(12) United States Patent
Takenaka et al.

(10) Patent No.: US 8,232,529 B2
(45) Date of Patent: *Jul. 31, 2012

(54) IMAGING APPARATUS, IMAGING SYSTEM, ITS CONTROLLING METHOD, AND STORAGE MEDIUM STORING ITS PROGRAM

(75) Inventors: Katsuro Takenaka, Honjo (JP); Tadao Endo, Honjo (JP); Toshio Kameshima, Kumagaya (JP); Tomoyuki Yagi, Honjo (JP); Keigo Yokoyama, Honjo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/018,576

(22) Filed: Feb. 1, 2011

(65) Prior Publication Data

US 2011/0121183 A1 May 26, 2011

Related U.S. Application Data

(62) Division of application No. 12/050,220, filed on Mar. 18, 2008, now Pat. No. 7,915,589.

(30) Foreign Application Priority Data

Apr. 6, 2007 (JP) ................................ 2007-100813

(51) Int. Cl.
*G01T 1/20* (2006.01)
*G01T 1/208* (2006.01)

(52) U.S. Cl. ............... 250/366; 250/370.09; 250/370.11; 257/291; 257/397; 378/4; 378/91; 378/207

(58) Field of Classification Search ............... 250/252.1, 250/361 R–363.07, 370.08–370.14; 257/291, 257/397; 378/4, 91, 307
See application file for complete search history.

(56) References Cited

U.S. PATENT DOCUMENTS

| 5,818,898 | A | 10/1998 | Tsukamoto et al. | 378/98.8 |
| 6,127,684 | A | 10/2000 | Kaifu | 250/370.09 |
| 6,271,880 | B1 | 8/2001 | Kameshima et al. | 348/244 |
| 6,351,519 | B1 | 2/2002 | Bonk et al. | 378/98.8 |
| 6,690,493 | B1 | 2/2004 | Kobayashi et al. | 358/482 |
| 6,818,899 | B2 | 11/2004 | Endo | 250/370.14 |
| 6,965,111 | B2 | 11/2005 | Endo | 250/370.11 |
| 7,573,037 | B1 | 8/2009 | Kameshima et al. | 250/370.09 |
| 2002/0186813 | A1 | 12/2002 | Tamura et al. | 378/98.8 |
| 2004/0227084 | A1 | 11/2004 | Nonaka | 250/336.1 |
| 2005/0087695 | A1 | 4/2005 | Endo | 250/370.11 |
| 2005/0088566 | A1 | 4/2005 | Tamura et al. | 348/362 |
| 2006/0289769 | A1 | 12/2006 | Yagi et al. | 250/362 |

FOREIGN PATENT DOCUMENTS

| JP | 10-208016 A | 8/1998 |
| JP | 2002-281399 A | 9/2002 |
| JP | 2006-516179 A | 6/2006 |
| JP | 2006-239117 A | 9/2006 |
| JP | 2007-019577 A | 1/2007 |

*Primary Examiner* — David Porta
*Assistant Examiner* — Casey Bryant
(74) *Attorney, Agent, or Firm* — Fitzpatrick, Cella, Harper & Scinto

(57) ABSTRACT

An idling time period after applying a bias to a conversion element until a start of an accumulation of the conversion element for deriving an image and an accumulation period from the start of the accumulation to a termination of the accumulation are measured. An offset correction of the image is conducted by using a dark current accumulation charge quantity in the accumulation calculated based on the measured idling time period and accumulation period and stored dark current response characteristics. Thus, even just after applying the bias to the conversion element, the offset correction can be properly conducted. An imaging apparatus which can execute a good radiographing without increasing costs and a size even just after applying the bias to the conversion element is provided.

9 Claims, 11 Drawing Sheets

IMAGING APPARATUS, IMAGING SYSTEM, ITS CONTROLLING METHOD, AND STORAGE MEDIUM STORING ITS PROGRAM

CROSS-REFERENCE TO RELATED APPLICATION

The present application is a division of application Ser. No. 12/050,220, filed Mar. 18, 2008, the entire disclosure of which is hereby incorporated herein by reference.

BACKGROUND OF THE INVENTION

1. Field of the Invention

The present invention relates to an imaging apparatus, an imaging system, its controlling method, and its program and, more particularly, to an offset correcting technique regarding a photographed image.

2. Description of the Related Art

Hitherto, most of photographs have been film photographs (silver salt photographs) obtained by using an optical camera and a silver salt film. In association with the development of a semiconductor technique, an imaging apparatus such as a video camcorder which can photograph a motion image by using a solid-state imaging device using a silicon (Si) single crystalline sensor represented by a CCD type sensor or an MOS type sensor has been being developed. However, an image obtained by such an imaging apparatus using the solid-state imaging device is inferior to the film photograph in terms of the number of pixels and an S/N ratio. The film photograph is generally used in order to photograph a still image.

On the other hand, in recent years, demands for an image processing by a computer, a preservation by an electronic file, a transmission of the image by E-mail, and the like are increasing. An electronic imaging apparatus for outputting a photograph image, as a digital signal, which is not inferior to the film photograph image is demanded. This is true of not only general photographs but also inspection and medical fields.

For example, there is an X-ray radiograph as a photograph using a photograph technique in the medical field. An X-ray generated from an X-ray source is irradiated to an affected part of a human body as an object and the X-ray radiograph is used to discriminate the presence or absence of a fracture of a bone or a tumor or the like based on information of a transmission of the X-ray. The X-ray radiograph is widely used for a medical diagnosis for a long time. Ordinarily, the X-ray transmitted through the affected part enters a phosphor once, is converted into visible light, and thereafter, is exposed to a silver salt film.

However, although the silver salt film has such advantages that a sensitivity and a resolution are high, there is such disadvantages that it is troublesome for development, it takes a time for preservation and management, the film cannot be sent soon to a remote plate, and the like. Therefore, an electron X-ray imaging apparatus for outputting the photograph image, as a digital signal, which is not inferior to the film photograph image as mentioned above is demanded. This is true of not only the medical field but also a non-destructive inspection field of a specimen such as a structure or the like.

To meet such a demand, an imaging apparatus (Flat Panel Detector; hereinbelow, abbreviated to "FPD") using a large-scale sensor obtained by two-dimensionally arranging imaging devices having photoelectric conversion elements made of amorphous silicon hydride has been being developed. The FPD is realized by using such a principle that when an electric field in the reverse direction is applied to the photoelectric conversion element, a photoelectric current according to a quantity of incident light flows in a semiconductor layer.

According to the FPD, for example, a metal layer, an amorphous silicon layer, or the like is deposited onto an insulating substrate whose one side is equal to about 30 to 50 cm by using a sputtering apparatus, a chemical vapor evaporation deposition apparatus (CVD apparatus), or the like and the photoelectric conversion elements (photodiodes) and thin film transistors (hereinbelow, abbreviated to "TFTs") are formed. Thus, for example, about (2000×2000) photoelectric conversion elements are formed, the electric field of a reverse bias is applied to them, and, at the same time, charges flowing in the reverse direction of each of the photoelectric conversion elements can be individually detected by the formed TFTs.

However, according to the FPD, a current called a dark current flows even in a state where no light is irradiated, thereby causing an artifact in the image. Further, the dark current exerts an influence as a shot noise on the image and becomes one of factors which cause detecting ability, that is, a sensitivity (S/N ratio) of the whole apparatus to be deteriorated. There is a case where such a deterioration exercises an adverse influence on the medical diagnosis and the judgment about the inspection. For example, naturally, a problem occurs if one of a focus and a defective part is overlooked due to the shot noise as a cause. It is, therefore, important to reduce the dark current as much as possible.

SUMMARY OF THE INVENTION

The dark current in the FPD has time-dependent response characteristics as illustrated in FIG. 11. As illustrated in FIG. 11, the dark current just after a bias was applied to the photoelectric conversion element is largest and decreases gradually (is settled) with the elapse of time. The following two causes of it are considered.

One of them is that, generally, in the case of forming the photoelectric conversion element by an amorphous silicon semiconductor as a main component material, defect levels are formed by one of a dangling bond in an amorphous semiconductor film and impurities mixed in a forming process. Those defect levels function as trapping levels. Even just after the bias was applied or before it is applied, ones of electrons and holes have been trapped and, after the elapse of a time of a few milliseconds to tens of seconds, they are thermally excited to a conduction band or a valence band and a conduction current (dark current) flows.

In the case of an MIS (Metal Insulator Semiconductor) type photoelectric conversion element, it is generally known that there are many trapping levels particularly in an interface portion between a semiconductor layer (I layer) and an injection blocking layer (for example, N layer). In the case of using the MIS type photoelectric conversion element of a crystalline type without using the amorphous semiconductor film, it is generally known that there are not as many trapping levels as those in the case of using the amorphous semiconductor film although it depends on processing conditions and apparatus upon forming the element. However, in the interface portion between the semiconductor layer (I layer) and the injection blocking layer (for example, N layer), there are many mismatched crystal lattices, the trapping level is not equal to zero, and there is a tendency of an output of the photoelectric conversion element illustrated in FIG. 11.

It is considered that the other one of the causes is concerned with characteristics of the injection blocking layer. For example, when the injection blocking layer is made of N type amorphous silicon, ideally, no holes are injected into the semiconductor layer side. However, actually, particularly, in the case of amorphous, the N layer does not perfectly block the holes. The holes which have passed through the N layer and injected into the semiconductor layer (I layer) become the dark current. The holes are accumulated in the interface between the semiconductor layer (I layer) and the insulating layer. An internal electric field in the I layer is lightened together with the accumulation of the holes. Since a quantity of holes injected into the I layer from the N layer decreases together with the lightening of the electric field, the dark current is attenuated.

In a manner similar to the MIS type photoelectric conversion element, also in the case of a PIN type photoelectric conversion element having amorphous silicon as a component material, it takes a predetermined time until the dark current becomes stable after the bias was applied. It is considered that this is because of the defect levels existing in the film. Similarly, in the case of amorphous selenium, gallium arsenide, mercury iodide, lead iodide, or cadmium telluride which absorbs a radiation and directly converts into an electric signal, it likewise takes a predetermined time until the dark current becomes stable.

As a method of eliminating such a response of the dark current which depends on the time as mentioned above, there is a method of always continuously applying the bias to the photoelectric conversion element. However, if the bias is continuously applied to the photoelectric conversion element, the number of defects in the semiconductor is increased by the flowing current, the characteristics are gradually deteriorated, and a phenomenon such as increase in dark current, decrease in photoelectric current, or the like appears. If the electric field is continuously applied by the applying of the bias, not only the number of defects increases but also there is a case where it becomes a cause of a shift of a threshold value of the TFT and a cause of corrosion of a metal which is used for wirings due to a movement of ions and an electrolysis, resulting in a deterioration of the reliability of the whole apparatus. The deterioration of the reliability is undesirable upon manufacturing products of the medical apparatus and inspecting apparatus. For example, it is undesirable that the apparatus fails during the diagnosis, treatment, or inspection which needs emergency. Therefore, it is necessary to design the FPD so that the photoelectric conversion element is made inoperative when the FPD is not used.

Unlike the photographing using the film, according to the FPD, since the photograph image can be displayed onto a monitor and a diagnosis can be made just after the photographing, it is expected to use the FPD in a field where the photographing and the diagnosis are performed in a short time as in emergency medical services. However, since the dark current of the photoelectric conversion element as mentioned above has the response characteristics which depends on the time, just after the bias was applied to the photoelectric conversion element, the dark current is large and the artifact and noise occur, so that picture quality deteriorates.

Therefore, in the Official Gazette of U.S. Pat. No. 6,127, 684, the X-ray radiographing is performed after the response of the dark current is settled. An offset image to which no X-ray is irradiated is radiographed after or before the X-ray radiographing and a difference between the offset image and the X-ray image obtained by the X-ray radiographing is calculated, thereby removing the dark current component of the X-ray image (hereinbelow, such a process is referred to as an offset correction). According to the former method, since the operator has to wait for a predetermined time after the bias was applied to the photoelectric conversion element, there is such a problem that the apparatus cannot be used in case of emergency and an operability is low. According to the latter method, since the dark current is large just after the bias was applied to the photoelectric conversion element, there is such a problem that even if the difference is calculated, the dark current component cannot be perfectly removed.

In the Official Gazette of U.S. Pat. No. 5,818,898, the dark current (noise quantity data) per unit time is stored into a memory. Accumulation noise quantity data is calculated based on an accumulation period upon radiographing measured by an accumulation period measuring circuit and the noise quantity data per unit time, and the accumulation noise quantity data is subtracted from the X-ray image, thereby conducting the offset correction. However, since the dark current has the response characteristics which depends on the time elapsed after the bias was applied to the photoelectric conversion element as mentioned above, there is such a problem that the dark current component cannot be perfectly subtracted from the X-ray image.

In the Official Gazette of U.S. Pat. No. 6,965,111, the dark current is stabilized by irradiating light to the photoelectric conversion element by using a light source such as LED, EL, or the like. However, the light source has to be equipped, resulting in an increase in costs and size of the FPD.

It is an object of the invention to provide an imaging apparatus in which even just after a bias was applied to a photoelectric conversion element, a good radiographing can be performed without increasing costs and a size of the apparatus.

According to the invention, there is provided an imaging apparatus comprising: a detection unit including a plurality of conversion elements arranged in an array on a substrate for converting an incident radiation or incident light into an electric signal, to derive an image based on the electric signal; a memory unit for storing a dark current response characteristics of the detection unit after applying a bias to the conversion element; a first time period measuring unit for measuring a first time period from an applying of a bias to the conversion element until a start of an accumulation of the conversion element for deriving the image; a second time period measuring unit for measuring a second time period from a start of the accumulation until an end of the accumulation; an accumulation charge quantity arithmetic operation unit for calculating a dark current accumulation charge quantity included in the accumulation based on the dark current response characteristics and the first and second time periods; and an image processing unit for conducting an offset correction of the image derived based on the dark current accumulation charge quantity.

According to the invention, there is provided an imaging system comprising: the image apparatus; and a radiation generating apparatus for generating the radiation.

According to the invention, there is provided a controlling method of an imaging apparatus having a detection unit including a plurality of conversion elements arranged in an array on a substrate for converting an incident radiation or incident light into an electric signal, to derive an image based on the electric signal and a memory unit for storing a dark current response characteristics of the detection unit after applying a bias to the conversion element, comprising steps of: measuring a first time period from an applying of a bias to the conversion element until a start of an accumulation of the conversion element for deriving the image; measuring a second time period from a start of the accumulation until an end of the accumulation; calculating a dark current accumulation charge quantity included in the accumulation based on the dark current response characteristics and the first and second time periods; and conducting an offset correction of the image derived based on the dark current accumulation charge quantity calculated.

According to the invention, there is provided a storage medium for storing a program for a controlling method of an imaging apparatus having a detection unit including a plurality of conversion elements arranged in an array on a substrate for converting an incident radiation or incident light into an electric signal, to derive an image based on the electric signal and a memory unit for storing a dark current response characteristics of the detection unit after applying a bias to the conversion element, wherein the program controls a computer to execute steps of: measuring a first time period from an applying of a bias to the conversion element until a start of an accumulation of the conversion element for deriving the image; measuring a second time period from a start of the accumulation until an end of the accumulation; calculating a dark current accumulation charge quantity included in the accumulation based on the dark current response characteristics and the first and second time periods; and conducting an offset correction of the image derived based on the dark current accumulation charge quantity calculated.

According to the invention, the dark current accumulation charge quantity is calculated based on the idling time period from the applying of the bias to the conversion element until the start of the radiographing for deriving the image, the accumulation period upon radiographing, and the dark current response characteristics. Since the offset correction of the image is conducted by using the calculated dark current accumulation charge quantity, even just after the bias was applied, the offset correction is properly conducted without increasing the costs and size of the apparatus, and the good radiographing can be performed.

Further features of the present invention will become apparent from the following description of exemplary embodiments with reference to the attached drawings.

DESCRIPTION OF THE EMBODIMENTS

Exemplary embodiments of the invention will be described hereinbelow with reference to the drawings.

First Embodiment

Figure 1:
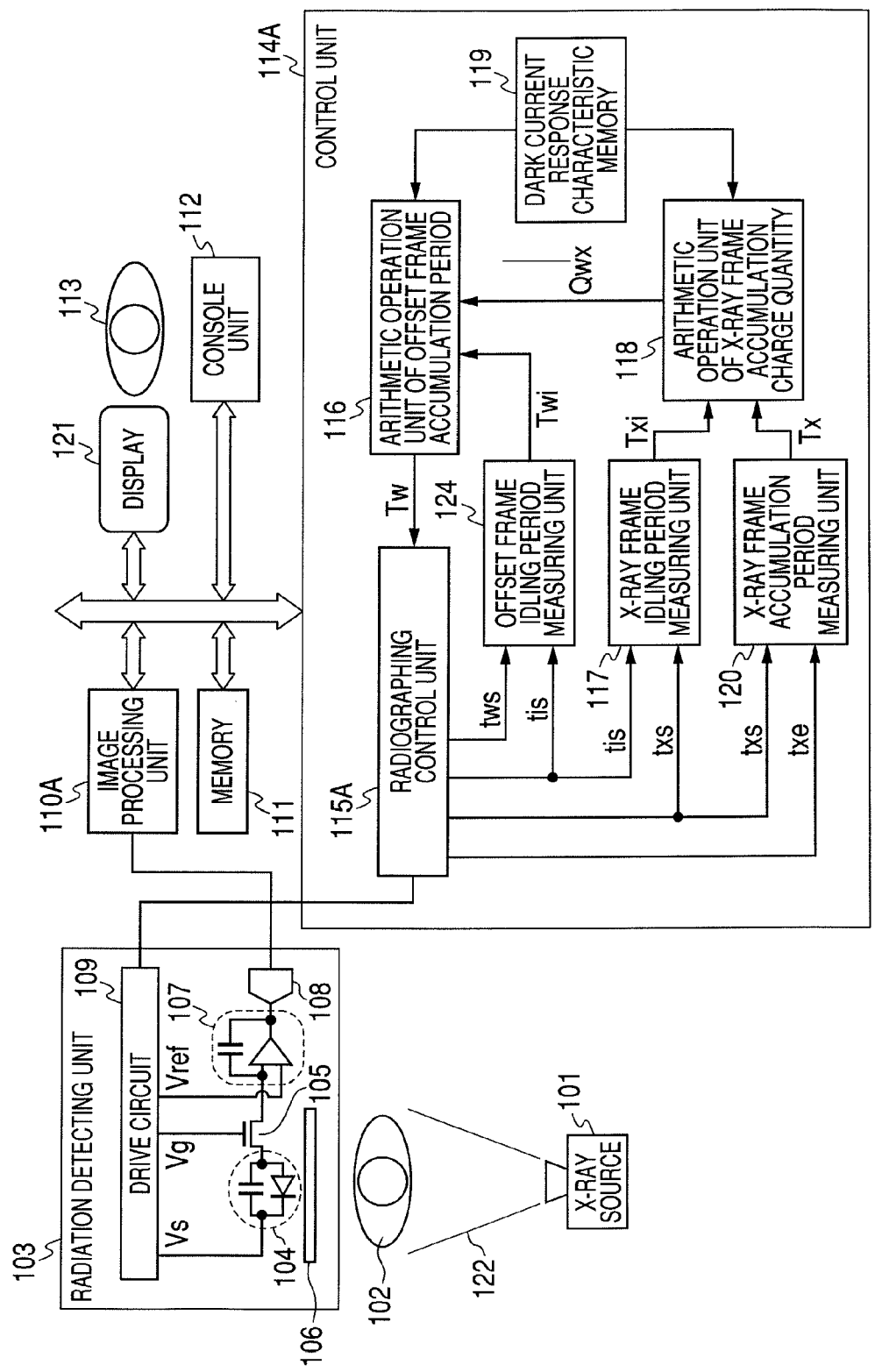
FIG. 1 is a diagram illustrating a schematic construction of an imaging system in the first embodiment.

FIG. 1 is a schematic constructional diagram illustrating an imaging system in the first embodiment of the invention. In FIG. 1, a construction excluding an X-ray source 101 serving as a radiation generating apparatus and its control system corresponds to an imaging apparatus. The imaging system in the first embodiment is constructed by the X-ray source 101, its control system, and the imaging apparatus. In the imaging apparatus in the first embodiment, a motion image photographing mode for executing a fluoroscopy or the like and a still image photographing mode for executing a radiography can be selectively freely set.

The whole operation of the imaging system in the embodiment is controlled by a control unit 114A. A console unit 112 has a touch panel on a display 121, a mouse, a keyboard, a joystick, a footswitch, and the like. In the imaging system in the embodiment, an operator 113 can make various types of settings such as radiographing conditions (still image, motion image, tube voltage, tube current, irradiation time period, etc.), radiographing timing, image processing conditions, object ID, processing method of a fetched image, and the like from the console unit 112.

The radiographing conditions based on one of an instruction of the operator 113 which is input through the console unit 112 and an instruction of a radiation information system are instructed by the control unit 114A to a radiographing control unit 115A for controlling a radiographing sequence and data is fetched. Based on the instructions, the radiographing control unit 115A drives the X-ray source 101 as a radiation source, a bedstead for radiographing (not shown), and a radiation detecting unit 103, fetches image data, and transfers to an image processing unit 110A. The image processing unit 110A executes an image processing designated by the operator 113 to the transferred image data, displays to the display 121, and at the same time, stores the raw data obtained by executing fundamental image processings such as offset correction, white correction, defect correction, and the like into a memory 111.

Further, based on the instruction of the operator 113, the control unit 114A executes a re-image processing and a reproduction display regarding the image data stored in the memory 111, a transfer and preservation of the image data into an apparatus on a network, a display onto the display, a printing to a film, or the like.

Subsequently, the operation of the imaging system illustrated in FIG. 1 will be sequentially described according to a flow of a signal. The X-ray source 101 includes an X-ray tube and an X-ray diaphragm. The X-ray tube is driven by a high-voltage generating power source controlled by the radiographing control unit 115A and irradiates an X-ray beam 122 as a radiation. The X-ray diaphragm is driven by the radiographing control unit 115A and shapes the X-ray beam 122 in association with a change in radiographing region so that the unnecessary X-ray irradiation is not executed.

The X-ray beam 122 irradiated from the X-ray source 101 is directed to an object 102 lying on the X-ray penetrating bedstead for radiographing. The radiographing bedstead is driven based on the instruction of the radiographing control unit 115A. The X-ray beam 122 irradiated to the object 102 penetrates the object 102 and the radiographing bedstead and, thereafter, enters the radiation detecting unit 103.

The radiation detecting unit 103 has a grid (not shown), a phosphor 106, a photoelectric conversion element 104, a switching element 105, a reading circuit 107, an A/D converter (ADC) 108, a drive circuit 109, and an X-ray exposure quantity monitor (not shown). The grid reduces an influence of an X-ray scatter caused after the X-ray beam 122 penetrated the object 102. The grid is formed from an X-ray low-absorbing material and an X-ray high-absorbing material and has a stripe structure of, for example, Al (aluminum) and Pb (lead). At the time of the X-ray irradiation, the grid is vibrated based on the instruction of the radiographing control unit 115A so as not to cause a moire due to a relation of a lattice ratio of the radiation detecting unit 103 (in more detail, photoelectric conversion element 104 arranged on the substrate) and the grid.

The phosphor 106 as a wavelength converter absorbs the X-ray which penetrated the object 102, excites the light emission center in the phosphor 106, and emits visible light. That is, the phosphor 106 converts a wavelength of the incident X-ray. The visible light emitted from the phosphor 106 is irradiated onto a photosensitive surface of the photoelectric conversion element 104 arranged on the insulating substrate and photoelectrically converted. Further, the photoelectrically converted signal charges are supplied to the reading circuit 107 through the switching element 105 likewise arranged on the insulating substrate and converted into a voltage signal by an integrating amplifier of the reading circuit 107. The voltage signal converted by the integrating amplifier of the reading circuit 107 is converted from an analog signal into a digital signal by the ADC 108 and transferred to the outside of the radiation detecting unit 103. The drive circuit 109 drives the photoelectric conversion element 104, switching element 105, and reading circuit 107 based on the control from the radiographing control unit 115A so that the reading operation of the signal is executed in this manner.

As a photoelectric conversion element 104, for example, an MIS type or PIN type thin film photoelectric conversion element using amorphous silicon hydride as a main component material, a PN photodiode using monosilicon (single crystalline silicon), or the like can be mentioned. As a switching element 105, a thin film transistor using amorphous silicon, polysilicon (polycrystalline silicon), monosilicon, or the like or a well-known MOS transistor can be used.

As a material of the insulating substrate, transparent glass in which an alkali component is small is mainly used. As a material of the phosphor 106, $Gd_2O_2S:Tb$, CsI:T1, or the like is used. The phosphor 106 is not limited to such a material but can be made of, for example, one kind, as a main component material, selected from $Gd_2O_2S$, $Gd_2O_3$, $CaWO_4$, $CdWO_4$, CsI, and ZnS.

The photoelectric conversion element 104 can be also constructed so as to have a function for absorbing the X-ray without passing through the phosphor 106 and directly converting into the electric signal. For example, the photoelectric conversion element 104 may be also made of one kind, as a main component material, selected from amorphous selenium, gallium arsenide, mercury iodide, lead iodide, or cadmium telluride.

The X-ray exposure quantity monitor monitors an X-ray transmission quantity. The X-ray exposure quantity monitor can directly detect the X-ray by using a photosensitive element made of crystalline silicon or the like or may detect the visible light which had penetrated the photoelectric conversion element 104 and the switching element 105. Information detected by the X-ray exposure quantity monitor is transmitted to the radiographing control unit 115A. The radiographing control unit 115A shuts off or adjusts the X-ray source 101 based on the information detected by the X-ray exposure quantity monitor. Although the radiographing control unit 115A is provided out of the radiation detecting unit 103 in the embodiment, the invention is not limited to such a construction but the radiographing control unit 115A may be provided in the radiation detecting unit 103.

An X-ray room where the radiographing is executed and a control room where the operator 113 executes the operation are different. The image signal from the radiation detecting unit 103 is transferred from the X-ray room for radiographing to the image processing unit 110A provided in the control room where the operator 113 executes the operation. Upon transferring, noises caused by the X-ray generation are large in the X-ray room and there is a case where the image data is not accurately transferred due to the noises. It is, therefore, necessary to raise a noise resistance of a transfer path. For example, it is desirable to use a transmission system having an error correcting function, a differential signal transmission system represented by LVDS (Low Voltage Differential Signaling), or a transfer path by an optical fiber.

The image processing unit 110A switches the display data based on an instruction of the radiographing control unit 115A. As other functions, the image processing unit 110A executes a correction of the image data (offset correction, white correction, defect correction), a space filtering, a recursive process, and the like in a real-time manner and, further, can execute a gradation process, a scattered line correction, various types of spatial frequency processes, and the like. The image processed in the image processing unit 110A is displayed on the display 121. Simultaneously with the real-time image processing, the basic image in which only the data correction has been conducted is stored in the memory 111. As a memory 111, a data storage device which can satisfy a large capacity, a high speed, and a high reliability is desirable. For example, a hard disk array of RAID or the like is desirable.

The image data stored in the memory 111 is reconstructed so as to satisfy a predetermined standard (for example, IS & C) and, thereafter, stored into an external storage device (not shown). The external storage device may be, for example, a magnetooptic disk, a hard disk in a file server in a LAN, or the like.

The imaging system in the embodiment can be also connected to the LAN through a LAN board and has a structure having a data compatibility with an HIS. Naturally, a plurality of imaging systems can be connected to the LAN and a monitor for displaying a motion image/still image, a file server for filing the image data, and the like are connected to the LAN. An image printer for outputting an image onto a film, an image processing terminal for executing a complicated image processing and supporting the diagnosis, and the are also connected. The imaging system in the embodiment outputs the image data according to a predetermined protocol (for example, DICOM). In addition, a real-time remote diagnosis by a doctor can be performed upon X-ray radiographing by using the monitor connected to the LAN.

Subsequently, the offset correction in the imaging system in the first embodiment will be described. The processing operation from the start of the operation until the image display will be sequentially described hereinbelow along the flowchart illustrated in FIG. 2 with reference to the schematic constructional diagram illustrated in FIG. 1, the flowchart illustrated in FIG. 2, and a timing chart illustrated in FIG. 3. In the following description, a light output which is obtained by irradiating the radiation and executing the radiographing (radiation photographing) (radiation image obtained by inputting the radiation) is called an X-ray frame and a dark output which is obtained by performing the radiographing without irradiating the radiation is called an offset frame.

First, a position of the object 102 and radiographing conditions such as tube voltage, tube current, irradiation time period, and the like are set (S101). After that, the radiographing is started (S102). When the radiographing is started, the radiographing control unit 115A issues a command to the drive circuit 109 in the radiation detecting unit 103. The drive circuit 109 which has received the command applies voltages to a bias wiring Vs, a gate wiring Vg, and a reference power source Vref of the reading circuit 107, respectively. By applying the voltages to the gate wiring Vg, the switching element 105 is turned on, a voltage (Vs−Vref) is applied to the photoelectric conversion element 104, and a state where the photoelectric conversion can be performed is obtained.

Figure 2:
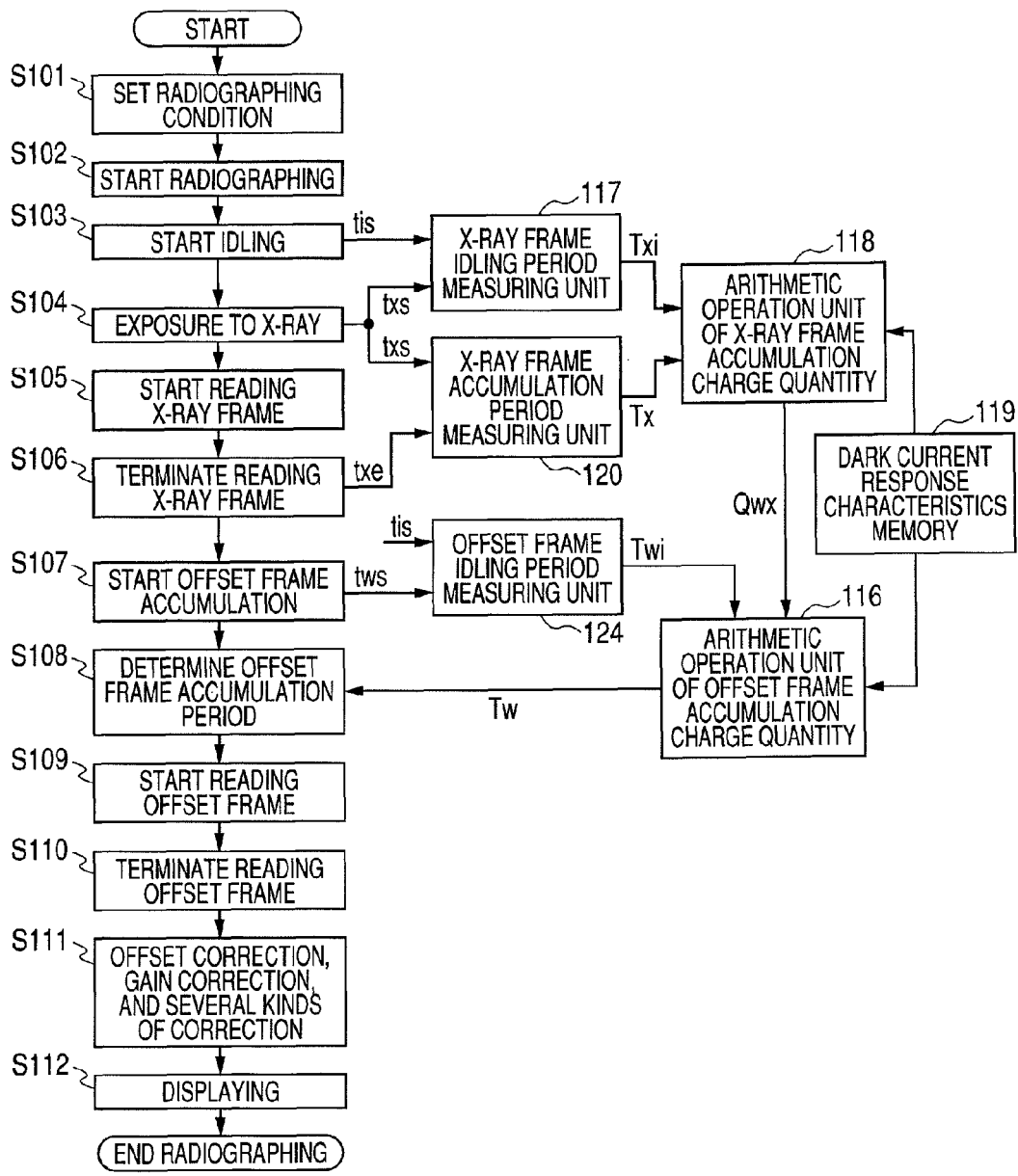
FIG. 2 is a flowchart illustrating the processing operation of the imaging system in the first embodiment.
Figure 3:
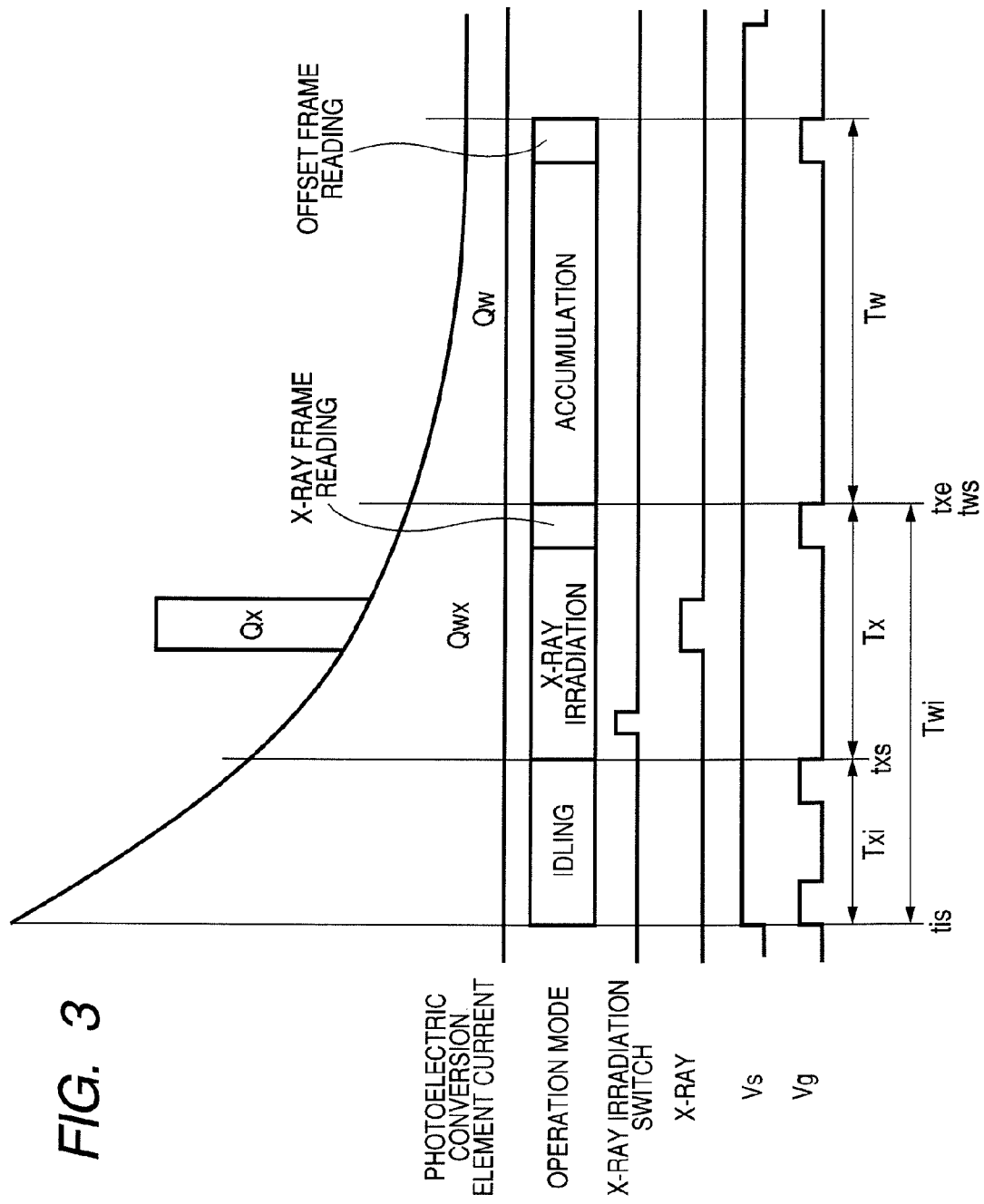
FIG. 3 is a timing chart illustrating drive timing of the imaging system in the first embodiment.

An idling illustrated in FIGS. 2 and 3 denotes a state where the bias has been applied to the photoelectric conversion element 104 as mentioned above. In the embodiment, whenever the operator 113 presses the X-ray irradiation switch, an operation mode can be immediately shifted to the reading operation. Upon idling, in order to reset the accumulation charges due to the dark current generated by applying the bias to the photoelectric conversion element 104, pulses are periodically applied to the gate wiring Vg, thereby turning on the switching element 105.

As a start time of the idling operation, the radiographing control unit 115A supplies time tis when the bias is applied to the photoelectric conversion element 104 of the radiation detecting unit 103 to an X-ray frame idling period measuring unit 117 and an offset frame idling period measuring unit 124. The X-ray frame idling period measuring unit 117 and the offset frame idling period measuring unit 124 stores the supplied start time tis of the idling operation (S103).

Subsequently, the X-ray irradiation switch is pressed by the operator 113 at arbitrary timing. Thus, as a termination time of the idling operation, the radiographing control unit 115A supplies time (dark current resetting time) txs when the switching element 105 is shifted from the ON state to the OFF state just before the depression of the X-ray irradiation switch to the X-ray frame idling period measuring unit 117. Further, the radiographing control unit 115A supplies the time txs as an accumulation start time of the X-ray frame to an X-ray frame accumulation period measuring unit 120. The X-ray frame idling period measuring unit 117 stores the supplied termination time txs of the idling operation and the X-ray frame accumulation period measuring unit 120 stores the supplied accumulation start time txs of the X-ray frame (S104).

The X-ray frame idling period measuring unit 117 calculates an idling time period Txi (=txs−tis) of the X-ray frame based on the start time tis and the termination time txs of the idling operation and outputs. The X-ray frame idling period measuring unit 117 corresponds to a first time period measuring unit. Since the arithmetic operating process by the X-ray frame idling period measuring unit 117 is executed in parallel with the radiographing process, even during the arithmetic operating process, the X-ray is irradiated and, after the termination of the irradiation, the radiation detecting unit 103 shifts the operation mode to the reading operation of the X-ray frame.

Upon reading the X-ray frame, by turning on the switching element 105 by applying the voltage to the gate wiring Vg, the charges in the photoelectric conversion element 104 are taken out by the reading circuit 107, converted into the digital signal by the ADC 108, and transferred to the image processing unit 110A. Thus, the X-ray image (radiation image) obtained in the X-ray frame is transferred to the image processing unit 110A (S105).

In the reading of the X-ray frame, a quantity of charges output from the photoelectric conversion element 104 is equal to the sum of a dark current accumulation charge quantity Qwx and an X-ray charge quantity Qx as shown in a photoelectric conversion element current in the timing chart of FIG. 3. The dark current accumulation charge quantity Qwx denotes a quantity of charges which are accumulated by the dark current according to the dark current response characteristics of the photoelectric conversion element 104. The X-ray charge quantity Qx denotes a quantity of charges obtained by the photoelectric conversion by the X-ray irradiation.

Subsequently, since the switching element 105 is shifted from the ON state to the OFF state, the transfer of the charges accumulated in the photoelectric conversion element 104 is terminated and the reading of the X-ray frame is terminated. At this time, as a reading termination time of the X-ray frame, the radiographing control unit 115A supplies time txe when the switching element 105 is shifted from the ON state to the OFF state to the X-ray frame accumulation period measuring unit 120. The X-ray frame accumulation period measuring unit 120 stores the supplied reading termination time txe of the X-ray frame. The X-ray frame accumulation period measuring unit 120 calculates an accumulation period Tx (=txe−txs) of the X-ray frame based on the accumulation start time txs and the reading termination time txe of the X-ray frame and outputs (S106). The X-ray frame accumulation period measuring unit 120 corresponds to a second time period measuring unit.

After the termination of the reading of the X-ray frame, an arithmetic operation unit 118 of the X-ray frame accumulation charge quantity calculates and predicts the dark current accumulation charge quantity Qwx of the X-ray frame by using the idling time period Txi and the accumulation period Tx of the X-ray frame and the dark current response characteristics stored in a dark current response characteristic memory 119. The dark current response characteristic memory 119 corresponds to a memory unit. Upon calculation of the dark current accumulation charge quantity Qwx of the X-ray frame, it is obtained by integrating a value obtained by calculating dark current response characteristics f(t) as shown in the following equation (1) with respect to a range from Txi to (Txi+Tx).

$$Qwx = \int_{Txi}^{Txi+Tx} f(t)dt \qquad (1)$$

In this instance, the smaller a difference between the actual dark current accumulation charge quantity of the X-ray frame and the calculated dark current accumulation charge quantity of the X-ray frame is, the image correction of the smaller artifact can be realized by the offset correction.

As for the dark current response characteristics f(t), for example, coefficients A and B approximated by an exponential function are preliminarily stored into the memory as shown in the following equation (2) and a calculation regarding the dark current accumulation charge quantity Qwx of the X-ray frame is executed.

$$f(t) = A\exp(-Bt) \qquad (2)$$

Although the dark current response characteristics have been approximated by using the exponential function in the embodiment, another function may be used so long as it can approximate the response characteristics. When obtaining the dark current response characteristics, there is a method of obtaining them upon shipping from the factory, a method of periodically updating them at an equipping location, or the like. However, if the response characteristics just before the radiographing are used, since there is no influence of the aging conversion in the photoelectric conversion element, the offset correction of higher precision can be conducted.

Subsequently, the offset frame is radiographed. In the case of continuously radiographing the offset frame after the termination of the reading of the X-ray frame, accumulation start time tws of the offset frame becomes reading termination time of the X-ray frame. In the case where a time period is provided in order to reduce an influence of an x-ray image lag regarding the X-ray frame and the offset frame is radiographed, the accumulation start time tws of the offset frame becomes time when the switching element 105 is shifted from the ON state to the OFF state just before the offset frame. In the embodiment, it is assumed that the offset frame is radiographed subsequently to the termination of the reading of the X-ray frame.

As accumulation start time of the offset frame, the radiographing control unit 115A supplies the reading termination time tws of the X-ray frame to the offset frame idling period measuring unit 124. The offset frame idling period measuring unit 124 stores the supplied accumulation start time of the offset frame (S107).

The offset frame idling period measuring unit 124 calculates an idling time period Twi of the offset frame based on the time (start time of the idling operation) tis when the bias is applied to the photoelectric conversion element 104 and the accumulation start time tws of the offset frame.

Subsequently, an arithmetic operation unit 116 of the offset frame accumulation period calculates an accumulation period Tw of the offset frame according to the following equation (3) by using the dark current accumulation charge quantity Qwx of the X-ray frame calculated as mentioned above, the idling time period Twi, and the dark current response characteristics f(t) (S108).

$$Qwx = \int_{Twi}^{Twi+Tw} f(t)dt \qquad (3)$$

The offset frame accumulation period arithmetic operation unit 116 outputs the calculated accumulation period Tw of the offset frame to the radiographing control unit 115A. After the elapse of the accumulation period Tw of the offset frame from the accumulation start time tws of the offset frame, the radiographing control unit 115A issues a reading start command of the offset frame to the radiation detecting unit 103. The radiation detecting unit 103 which has received the command reads out the offset frame (S109, S110). Since the reading of the offset frame is executed in a manner similar to that of the X-ray frame, its description is omitted.

After the termination of the reading of the offset frame, the read-out offset correction data is transferred to the image processing unit 110A. The image processing unit 110A executes a subtracting process (offset correction) of (X-ray image)−(offset correction data), further executes a necessary image processing such as gain correction or the like (S111), and allows the corrected image to be displayed onto the display 121 (S112).

In this manner, the dark current accumulation charge quantity Qwx of the X-ray frame is calculated and predicted by using the idling time period Txi of the X-ray frame, the accumulation period Tx of the X-ray frame, and the dark current response characteristics f(t). An accumulation period of the offset frame to obtain the charges, as offset correction data, of the same quantity as the calculated dark current accumulation charge quantity Qwx of the X-ray frame is determined. The offset correction of the X-ray image is conducted by the obtained offset correction data. Thus, an increase in size of the apparatus due to the addition of the new light source or the like is eliminated and even in the case of the dark current response characteristics in which a change just after applying the bias to the photoelectric conversion element 104 is large, the offset correction can be properly conducted and the good radiographing can be performed. By alternately repeating such a radiographing (radiation photographing) of the X-ray frame and the radiographing of the offset frame, the continuous radiographing of motion images can be also executed.

Although the description has been made above on the assumption that one photoelectric conversion element 104 and one switching element 105 are provided, actually, a plurality of photoelectric conversion elements 104 and a plurality of switching elements 105 are arranged on the insulating substrate in a one-dimensional or two-dimensional array shape.

Figure 4:
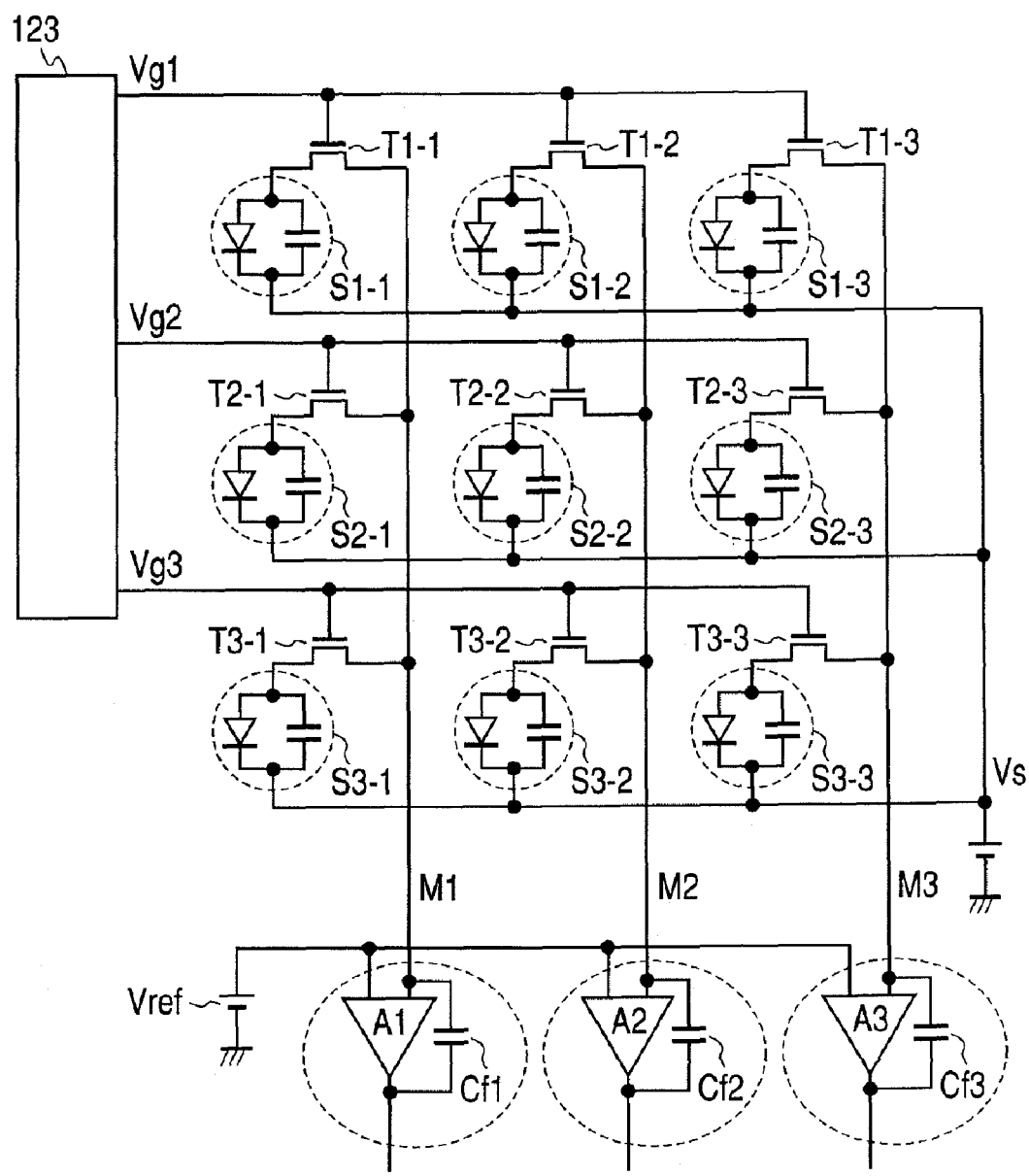
FIG. 4 is a diagram illustrating an example in which sets each constructed by a photoelectric conversion element and a switching element have been arranged in a two-dimensional matrix form.

FIG. 4 illustrates an example in which sets (pixels) each constructed by the photoelectric conversion element and the switching element are arranged in a two-dimensional matrix shape of 3×3. Although the matrix of (3×3) pixels has been illustrated for simplicity of description, the number of pixels can be arbitrarily set. The invention can be also applied to an area sensor of, for example, (2000×2000) pixels or more.

In FIG. 4, Sm-n denotes a photoelectric conversion element; Tm-n a switching element (TFT transistor); 123 a shift register for sequentially turning on the switching elements; and Vgm a gate wiring for transferring pulses for driving the switching elements. An denotes an amplifier (arithmetic operation amplifier) for reading out charges accumulated in the photoelectric conversion element Sm-n; Cfn an integration capacitor for integrating the signal charges when the charges are read out of the photoelectric conversion element Sm-n; Mn a signal wiring for transferring the signal charges; Vs the bias wiring for applying the bias to the photoelectric conversion element Sm-n; and Vref the reference power source of the reading circuit constructed by the amplifier An and the integration capacitor Cfn. Each of m and n denotes a suffix (m=natural number of 1 to 3, n=natural number of 1 to 3; this is true of the following description).

One end of the photoelectric conversion element Sm-n of the mth row and the nth column is connected to the bias wiring Vs and the other end is connected to the signal wiring Mn of the nth column through the switching element Tm-n of the mth row and the nth column. Control terminals (gates of the transistors) of the switching elements Tm-1 to Tm-3 of the mth row are connected to the gate wiring Vgm of the mth row. One input of the amplifier An of the nth column is connected to the reference power source Vref and the other input is connected to the signal wiring Mn of the nth column. The integration capacitor Cfn is connected in parallel between the other input and an output of the amplifier An.

Figure 5:
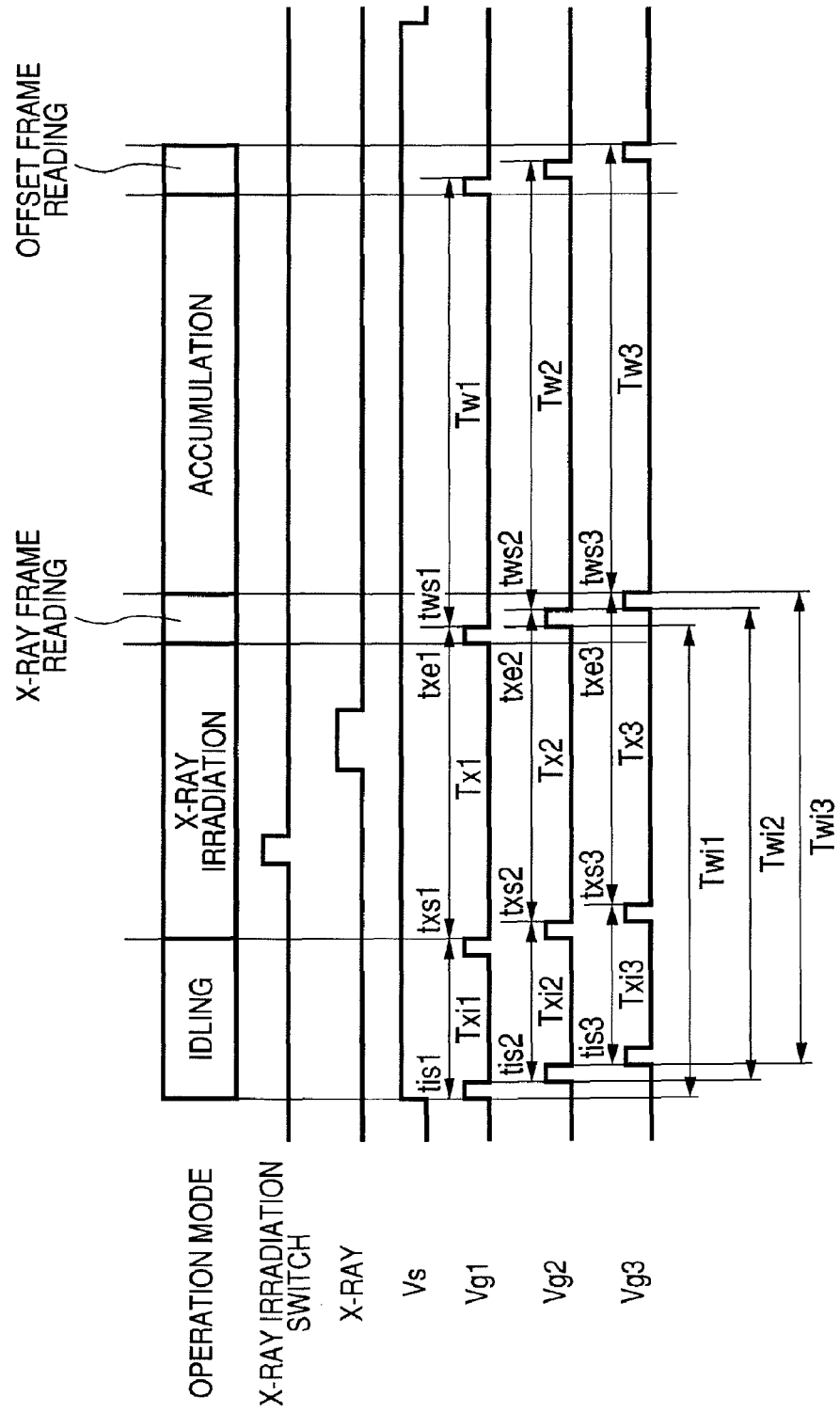
FIG. 5 is a timing chart illustrating drive timing in the construction illustrated in FIG. 4.

FIG. 5 is a timing chart illustrating drive timing in the case where the sets of the photoelectric conversion elements and the switching elements in the radiation detecting unit 103 are constructed as illustrated in FIG. 4. In the case of the construction illustrated in FIG. 4, since it has the matrix structure of (3×3) pixels, the idling time period of the X-ray frame and the accumulation period of the X-ray frame are measured every gate wiring and the accumulation period of the offset frame is measured every gate wiring.

First, when the radiographing is started, the radiographing control unit 115A issues a command to the drive circuit 109 in the radiation detecting unit 103. The drive circuit 109 which has received the command applies the voltages to the bias wiring Vs and the reference power source Vref of the reading circuit, respectively. The radiographing control unit 115A sequentially drives the gate wirings Vg1, Vg2, and Vg3 by the shift register 123, thereby sequentially turning on/off the switching elements T1-n, T2-n, and T3-n. By applying the bias and turning on the switching element Tm-n, the voltage (Vs−Vref) is applied to the photoelectric conversion element Sm-n and the dark current starts to flow. By applying the voltage to the gate wiring Vgm, the charges accumulated by the dark current by the photoelectric conversion element Sm-n can be reset.

As a start time of the idling operation, the radiographing control unit 115A supplies time tism when the bias has been applied to the photoelectric conversion element Sm-n to the X-ray frame idling period measuring unit 117 and the offset frame idling period measuring unit 124. The X-ray frame idling period measuring unit 117 and the offset frame idling period measuring unit 124 stores the supplied start time tism of the idling operation into the internal memory, respectively.

Subsequently, the X-ray irradiation switch is pressed by the operator. As termination time of the idling operation, the radiographing control unit 115A supplies time txsm when the switching element Tm-n is shifted from the ON state to the OFF state just before the depression of the X-ray irradiation switch to the X-ray frame idling period measuring unit 117. The X-ray frame idling period measuring unit 117 stores the supplied termination time txsm of the idling operation and calculates an idling time period Txim (=txsm−tism) of the X-ray frame every gate wiring Vgm.

As accumulation start time of the X-ray frame, the radiographing control unit 115A supplies the time txsm when the switching element Tm-n is shifted from the ON state to the OFF state just before the depression of the X-ray irradiation switch to the X-ray frame accumulation period measuring unit 120. The X-ray frame accumulation period measuring unit 120 stores the supplied accumulation start time txsm of the X-ray frame into the internal memory.

Subsequently, the X-ray is irradiated, the photoelectric conversion is executed in the photoelectric conversion element Sm-n, and the charges are generated. Thus, the radiographing control unit 115A sequentially drives the gate wirings Vgm and the charges accumulated in the photoelectric conversion element Sm-n are read out as a voltage signal by the amplifier An. The read-out voltage signal is A/D converted and transferred as an X-ray image to the image processing unit 110A. As reading termination time of the X-ray frame, the radiographing control unit 115A supplies time txem when the switching element Tm-n is shifted from the ON state to the OFF state to the X-ray frame accumulation period measuring unit 120. The X-ray frame accumulation period measuring unit 120 stores the supplied reading termination time txem of the X-ray frame and calculates an accumulation period Txm (=txem−txsm) of the X-ray frame every gate wiring Vgm.

Subsequently, the arithmetic operation unit 118 of the X-ray frame accumulation charge quantity reads out the idling time period Txim of the X-ray frame from the dark current response characteristic memory 119, the accumulation period Txm, and the dark current response characteristics of every gate wiring and calculates and predicts a dark current accumulation charge quantity of the X-ray frame.

Subsequently, as accumulation start time of the offset frame, the radiographing control unit 115A supplies time twsm to the offset frame idling period measuring unit 124. The offset frame idling period measuring unit 124 stores the supplied accumulation start time twsm of the offset frame and calculates an idling time period Twim (=twsm−tism) of the offset frame every gate wiring Vgm.

Further, the arithmetic operation unit 116 of the offset frame accumulation period calculates the accumulation period Twm of the offset frame by using the dark current accumulation charge quantity of the X-ray frame, the idling time period Twim, and the dark current response characteristics every gate wiring Vgm. The offset frame accumulation period arithmetic operation unit 116 outputs the calculated accumulation period Twm of the offset frame to the radiographing control unit 115A.

In a manner similar to the example illustrated in FIGS. 1 to 3, the reading of the offset frame is executed based on an instruction of the radiographing control unit 115A hereinbelow and the offset correction or the like is executed in the image processing unit 110A.

In the case of the area sensor having a plurality of pixels, as a method of deciding the accumulation period of the offset frame, there is a method of deciding it by using a mean value of all of the pixels, a method of deciding it every gate wiring as in the embodiment, or a method of deciding it on a pixel unit basis. Since the dark current response characteristics of the photoelectric conversion element differ every pixel depending on a variation upon manufacturing, it is desirable to decide the accumulation period of the offset frame on a pixel unit basis. By this method, the accumulation charge quantity of the X-ray frame due to the dark current and that of the offset frame can be perfectly made identical. However, since there is also a case where the memory capacity, processing time period, and reading time period increase, it is sufficient to control the accumulation period of the offset frame on a proper unit basis.

Second Embodiment

The second embodiment of the invention will now be described. In the foregoing first embodiment, after the X-ray frame was radiographed (radiation photograph), the offset frame is radiographed. The following case is considered: that is, if the offset frame is radiographed after radiographing the X-ray frame, an image lag occurs by an influence exerted by irradiating the light to the photoelectric conversion element, an image lag component is mixed into the offset frame, and an artifact occurs in the image obtained after the offset correction.

In the second embodiment, therefore, the offset frame is radiographed before radiographing (radiation photograph) the X-ray frame. Thus, it is possible to certainly prevent the influence of the image lag due to the radiographing of the X-ray frame from being exercised on the offset frame, it is possible to certainly prevent the artifact from occurring in the image obtained after completion of the offset correction, and the good image can be obtained without extending the radiographing time period.

Figure 6:
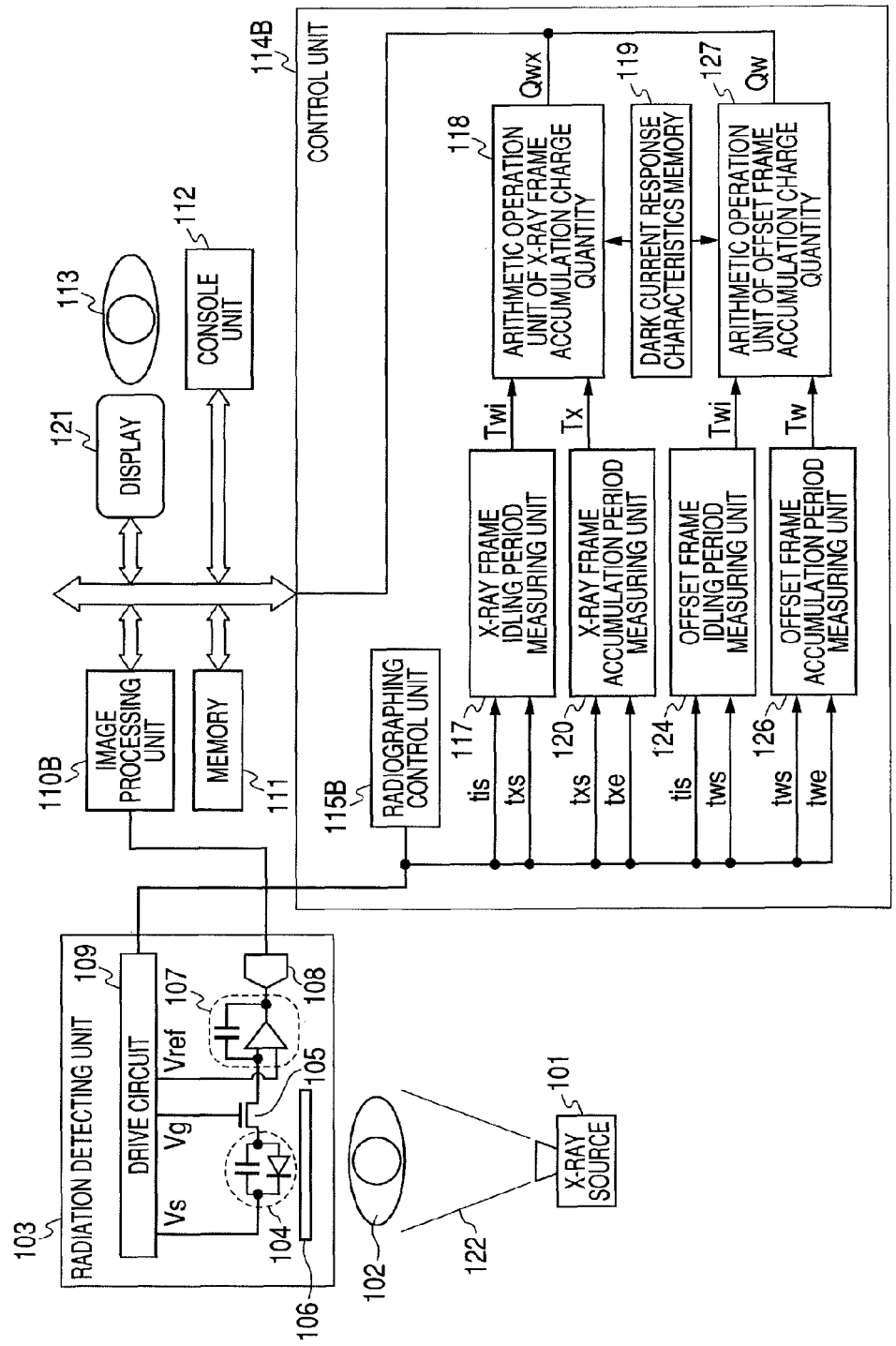
FIG. 6 is a diagram illustrating a schematic construction of an imaging system in the second embodiment.

FIG. 6 is a schematic constructional diagram of an imaging system in the second embodiment. In FIG. 6, component elements having substantially the same functions as those of the component elements illustrated in FIG. 1 are designated by the same reference numerals and their overlapped description is omitted here. Also in FIG. 6, a construction excluding the X-ray source 101 serving as a radiation generating apparatus and its control system corresponds to an imaging apparatus. The imaging system is constructed by the X-ray source 101, its control system, and the imaging apparatus.

The whole operation of the imaging system in the embodiment is controlled by a control unit 114B. The control unit 114B corresponds to the control unit 114A in the first embodiment although there is a different portion in an internal construction. A radiographing control unit 115B corresponds to the radiographing control unit 115A in the first embodiment. An image processing unit 110B corresponds to the image processing unit 110A in the first embodiment and the processing operation regarding the offset correction differs from that of the image processing unit 110A.

Although the second embodiment will be described on the assumption that one photoelectric conversion element 104 and one switching element 105 are provided, a plurality of photoelectric conversion elements 104 and a plurality of switching elements 105 may be arranged on the insulating substrate in a one-dimensional or two-dimensional array shape.

Figure 7:
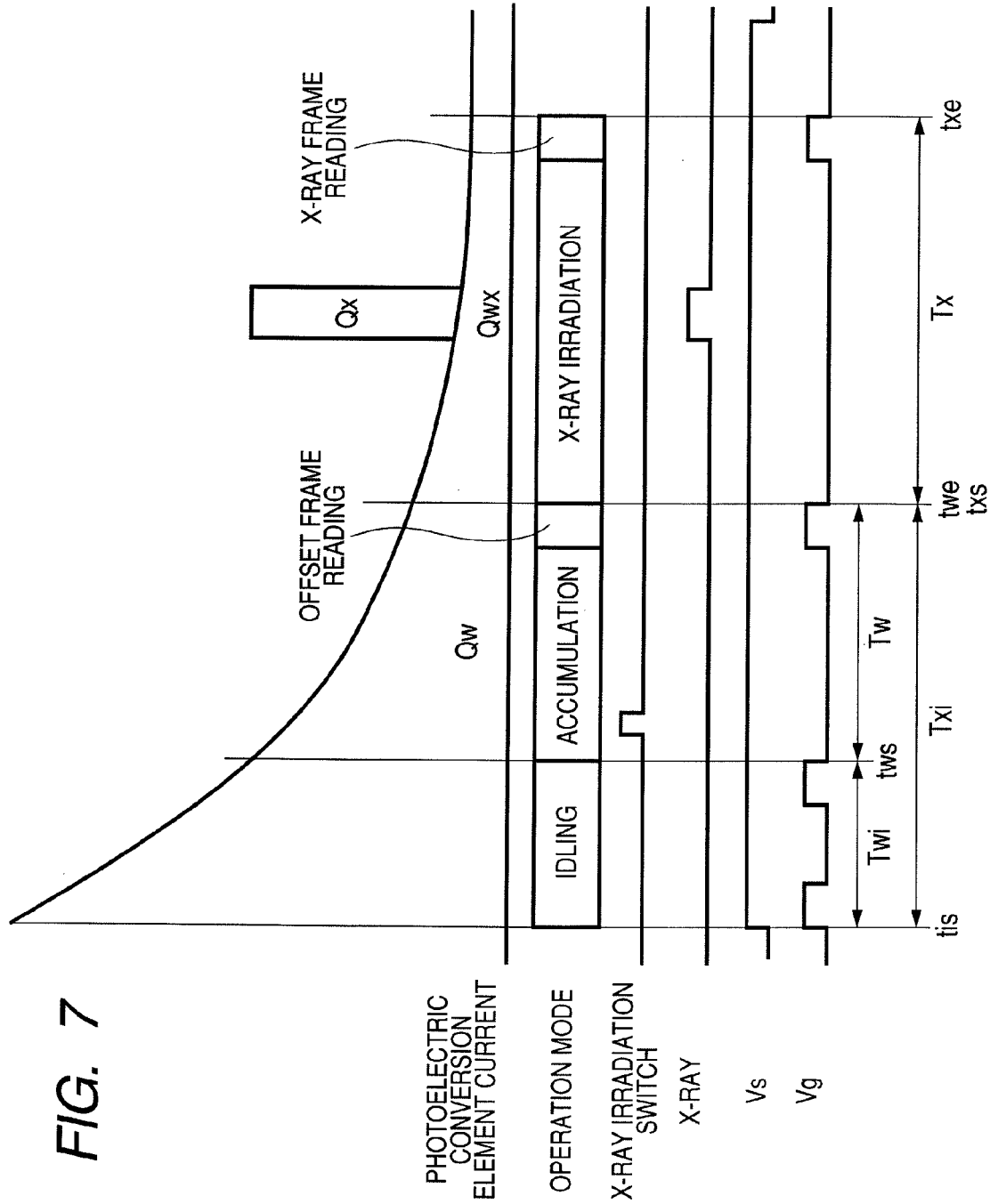
FIG. 7 is a timing chart illustrating drive timing of the imaging system in the second embodiment.
Figure 8:
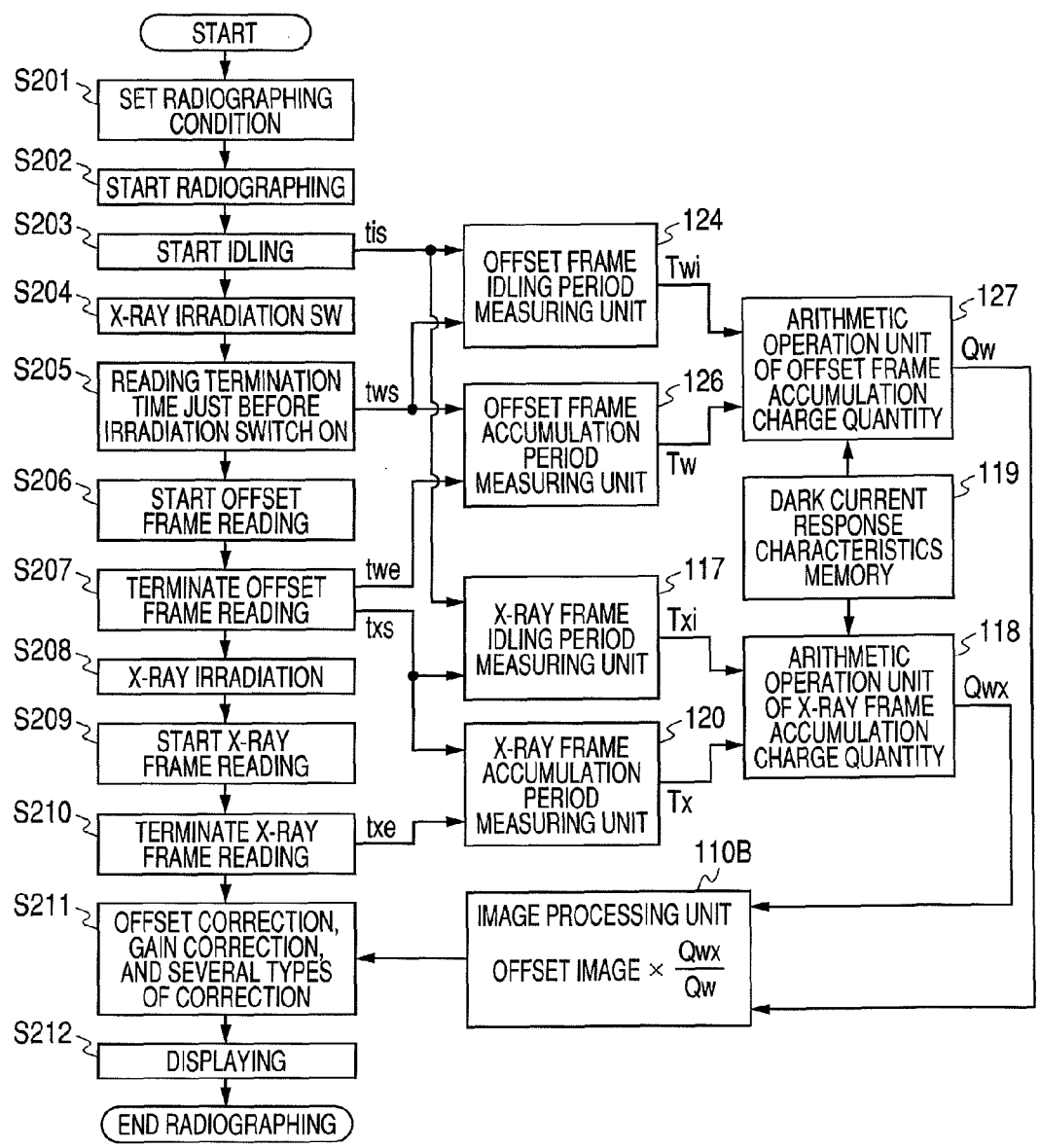
FIG. 8 is a flowchart illustrating the processing operation of the imaging system in the second embodiment.

The offset correction in the imaging system in the second embodiment will be described. The processing operation from the start of the operation until the image display will be sequentially described hereinbelow along a flowchart illustrated in FIG. 8 with reference to the schematic constructional diagram illustrated in FIG. 6, a timing chart illustrated in FIG. 7, and the flowchart illustrated in FIG. 8.

First, the position of the object 102 and radiographing conditions are set (S201). After that, the radiographing is started (S202). When the radiographing is started, in a manner similar to the first embodiment, the voltages are applied to the bias wiring Vs, the gate wiring Vg, and the reference power source Vref of the reading circuit 107 by the drive circuit 109 based on an instruction from the radiographing control unit 115B, respectively. The start time tis of the idling operation when the bias has been applied to the photoelectric conversion element 104 is supplied from the radiographing control unit 115B to the X-ray frame idling period measuring unit 117 and the offset frame idling period measuring unit 124 and stored (S203).

When the bias is applied to the photoelectric conversion element 104, the dark current starts to flow in the photoelectric conversion element 104. Therefore, the voltage is periodically applied to the gate wiring Vg before the X-ray irradiation switch is pressed by the operator 113. Thus, the accumulated charges by the dark current are periodically reset and the dark current (shot noises) accumulated in the offset frame can be reduced.

Subsequently, the X-ray irradiation switch is pressed by the operator 113 (S204). Thus, as termination time of the idling operation, the radiographing control unit 115B supplies the time tws when the switching element 105 has been turned off just before the X-ray irradiation switch is pressed to the offset frame idling period measuring unit 124. Further, as accumulation start time of the offset frame, the radiographing control unit 115B supplies the time tws to a measuring unit 126 of the offset frame accumulation period. The offset frame idling period measuring unit 124 stores the supplied termination time tws of the idling operation and the offset frame accumulation period measuring unit 126 stores the supplied accumulation start time tws of the offset frame (S205).

The offset frame idling period measuring unit 124 calculates the idling time period Twi (=tws−tis) of the offset frame based on the start time tis of the idling operation and the accumulation start time tws of the offset frame and outputs.

After that, after the elapse of an arbitrary accumulation period, the voltage is applied to the gate wiring Vg, the switching element 105 is turned on, and the reading of the offset frame is started (S206). When the switching element 105 is turned off and the reading of the offset frame is terminated, as reading termination time of the offset frame, the radiographing control unit 115B supplies time twe when the reading has been terminated to the offset frame accumulation period measuring unit 126 (S207).

The offset frame accumulation period measuring unit 126 stores the supplied reading termination time twe of the offset frame. The offset frame accumulation period measuring unit 126 calculates the accumulation period Tw (=twe−tws) of the offset frame based on the accumulation start time tws of the offset frame and the time twe when the reading has been terminated and outputs. The data read out by the reading operation of the offset frame is stored as offset data.

An arithmetic operation unit 127 of the offset frame accumulation charge quantity calculates a dark current accumulation charge quantity Qw of the offset frame based on the idling time period Twi and the accumulation period Tw of the offset frame and the dark current response characteristics stored in the dark current response characteristic memory 119.

As accumulation start time of the X-ray frame, the radiographing control unit 115B supplies the time txs when the switching element 105 is turned off and the reading of the offset frame has been terminated to the X-ray frame idling period measuring unit 117 and the X-ray frame accumulation period measuring unit 120. The X-ray frame idling period measuring unit 117 stores the supplied accumulation start time txs of the X-ray frame and calculates the idling time period Txi (=txs−tis) of the X-ray frame based on the start time tis of the idling operation and the accumulation start time txs of the X-ray frame and outputs. The X-ray frame accumulation period measuring unit 120 stores the supplied accumulation start time txs of the X-ray frame. The X-ray frame idling period measuring unit 117 corresponds to the first time period measuring unit. The X-ray frame accumulation period measuring unit 120 corresponds to the second time period measuring unit.

After the reading of the offset frame was terminated, the X-ray is irradiated and the reading of the X-ray frame is started (S208, S209). Upon reading of the X-ray frame, the quantity of charges which are output from the photoelectric conversion element 104 is equal to the sum of the dark current accumulation charge quantity Qwx of the charges accumulated by the dark current according to the dark current response characteristics and the X-ray charge quantity Qx of the charges obtained by the photoelectric conversion due to the irradiation of the X-ray.

When the reading of the X-ray frame is terminated, as a reading termination time of the X-ray frame, the radiographing control unit 115B supplies the time txe when the reading has been terminated to the X-ray frame accumulation period measuring unit 120 (S210). The X-ray frame accumulation period measuring unit 120 stores the supplied reading termination time txe of the X-ray frame. The X-ray frame accumulation period measuring unit 120 calculates the accumulation period Tx of the X-ray frame based on the accumulation start time txs and the reading termination time txe of the X-ray frame and outputs.

Further, the arithmetic operation unit 118 of the X-ray frame accumulation charge quantity calculates the dark current accumulation charge quantity Qwx of the X-ray frame by the equation (1) by using the idling time period Txi and the accumulation period Tx of the X-ray frame and the dark current response characteristics stored in the dark current response characteristic memory 119.

Subsequently, the image processing unit 110B multiplies the offset image as offset data by (Qwx/Qw) by using the dark current accumulation charge quantity Qw of the offset frame and the dark current accumulation charge quantity Qwx of the X-ray frame, thereby conducting the correction regarding the dark current component. The image processing unit 110B conducts the offset correction of the X-ray image by using the dark current corrected offset correction data and subsequently executes the necessary various types of image processing such as gain correction and the like (S211), thereby allowing the corrected image to be displayed onto the display 121 (S212).

As described above, the dark current accumulation charges can be also equalized by the image processing. Even just after applying the bias to the photoelectric conversion element 104, the proper offset correction according to the dark current response characteristics can be conducted without enlarging the size of apparatus and the good radiographing can be performed.

Although the offset correction has been conducted based on the dark current accumulation charge quantity obtained by arithmetically operating the offset data obtained by the radiographing in the second embodiment, the invention is not limited to such a method. For example, the offset correction can be also conducted by forming the offset correction data by a calculation based on the idling time period, the accumulation period, and the dark current response characteristics measured upon shipping from the factory or the like.

The continuous motion image radiographing can be also executed by alternately repeating the radiographing of the offset frame and the radiographing (radiation photograph) of the X-ray frame as mentioned above.

Further, the shot noises can be reduced by performing the radiographing in order of the offset frame radiographing→the X-ray frame radiographing→the offset frame radiographing and conducting the offset correction by the offset frame obtained by averaging the offset frames before and after the X-ray frame. In this instance, in addition to the second embodiment, the method of the first embodiment is applied, the accumulation period upon offset frame radiographing which is performed after the X-ray frame radiographing is adjusted, and the dark current accumulation charge quantity of the X-ray frame and each of the dark current accumulation charge quantities of the offset frames before and after the X-ray frame are equalized, thereby enabling the artifact to be reduced.

Third Embodiment

The third embodiment of the invention will now be described. The first and second embodiments have been described with respect to the case where the radiographing of one X-ray frame and the radiographing of one offset frame are performed. In the third embodiment, which will be described hereinbelow, the motion image radiographing is enabled by continuously radiographing the X-ray frames.

Since a construction of an imaging system in the third embodiment is similar to that of the imaging system in the second embodiment, its description is omitted.

Figure 9:
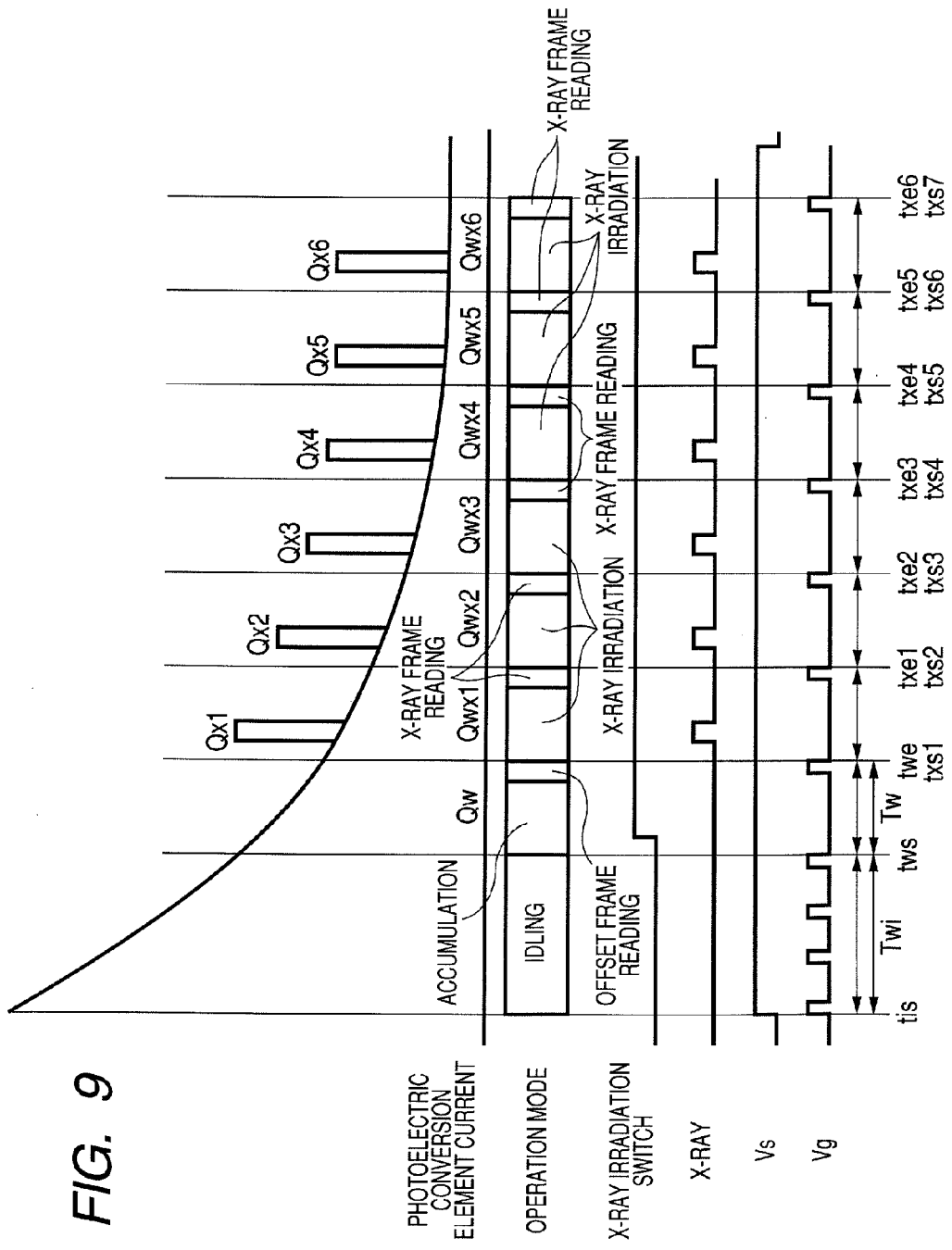
FIG. 9 is a timing chart illustrating drive timing of an imaging system in the third embodiment.
Figure 10:
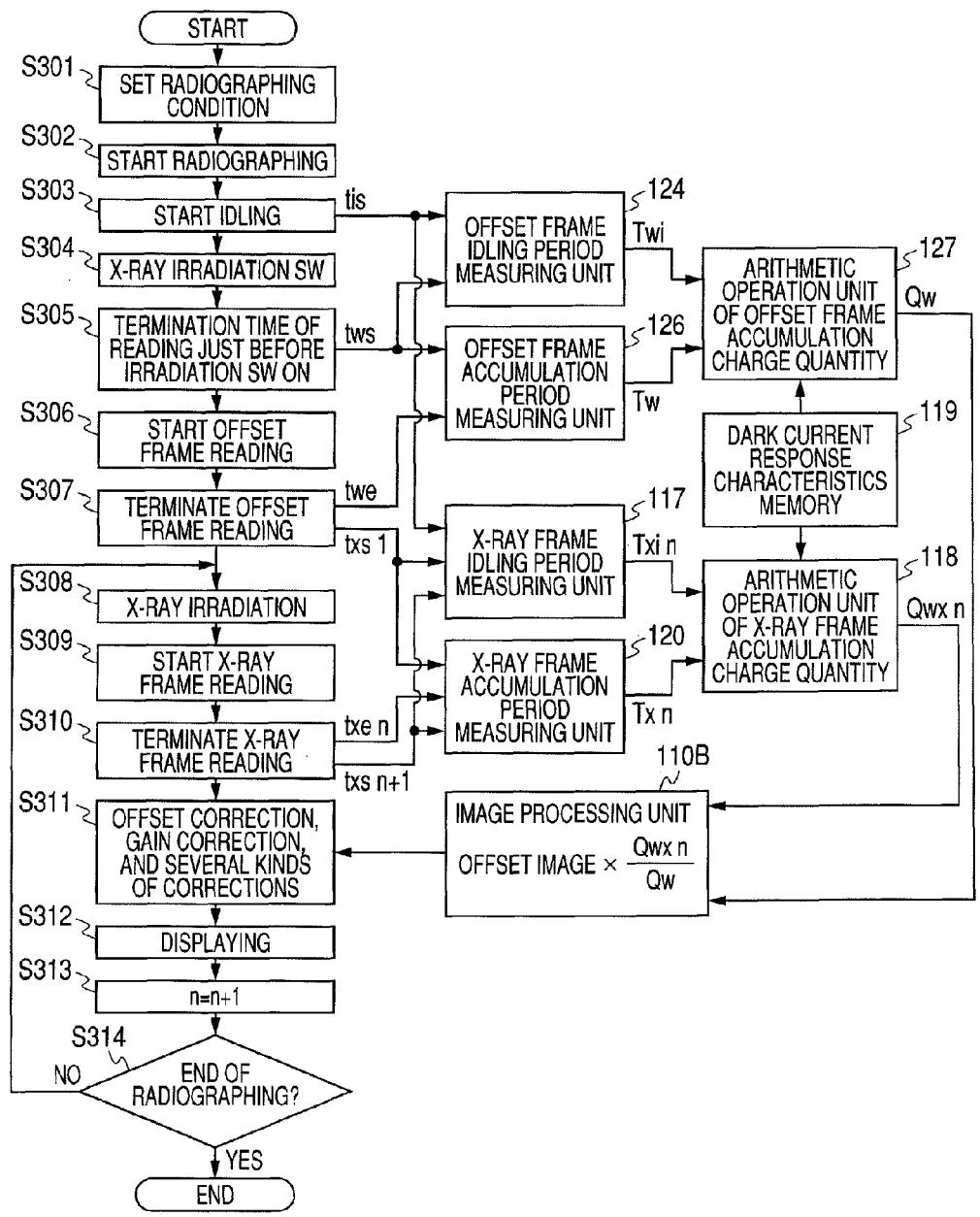
FIG. 10 is a flowchart illustrating the processing operation of the imaging system in the third embodiment.
Figure 11:
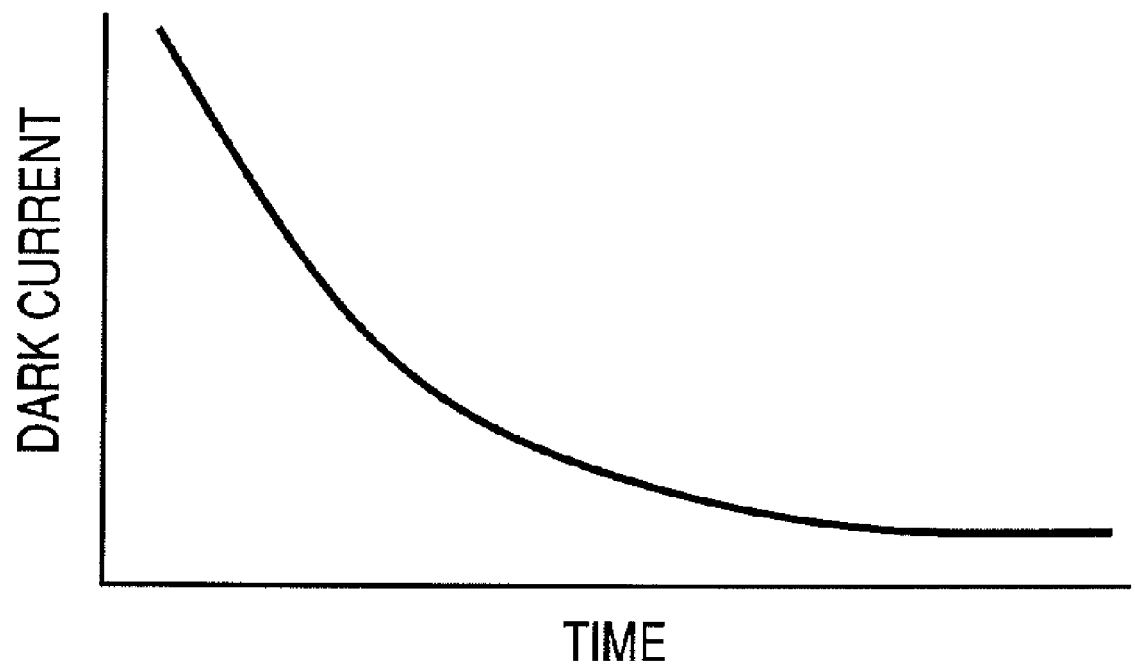
FIG. 11 is a diagram illustrating dark current response characteristics of the photoelectric conversion element.

An offset correction in the imaging system in the third embodiment will be described. The operation will be described hereinbelow along a flow of a flowchart illustrated in FIG. 10 with reference to a timing chart illustrated in FIG. 9 and the flowchart illustrated in FIG. 10.

The operation in steps S301 to S307 from the start of the operation until the termination of the reading of the offset frame is similar to the operation in steps S201 to S207 in the second embodiment.

In step S307, as accumulation start time of the first X-ray frame as a first frame, time txs1 when the reading of the offset frame has been terminated is supplied to the X-ray frame idling period measuring unit 117 and the X-ray frame accumulation period measuring unit 120. The X-ray frame idling period measuring unit 117 stores the supplied accumulation start time txs1 of the first X-ray frame. The X-ray frame idling period measuring unit 117 calculates an idling time period Txi1 (=txs1−tis) of the first X-ray frame based on the start time tis of the idling operation and the accumulation start time txs1 of the first X-ray frame and outputs. The X-ray frame accumulation period measuring unit 120 stores the supplied accumulation start time txs1 of the first X-ray frame.

After the reading of the offset frame was terminated, the X-ray is irradiated at the first time and the reading of the first X-ray frame is started (S308, S309). Upon reading of the first X-ray frame, a quantity of charges output from the photoelectric conversion element 104 is equal to the sum of a dark current accumulation charge quantity Qwx1 of the charges which are accumulated by the dark current according to the dark current response characteristics and an X-ray charge quantity Qx1 obtained by the photoelectric conversion by the X-ray irradiation.

When the reading of the first X-ray frame is terminated, as reading termination time of the first X-ray frame, the radiographing control unit 115B supplies time txe1 when the reading has been terminated to the X-ray frame accumulation period measuring unit 120 (S310). The X-ray frame accumulation period measuring unit 120 stores the supplied reading termination time txe1 of the first X-ray frame. The X-ray frame accumulation period measuring unit 120 calculates an accumulation period Tx1 of the first X-ray frame based on the accumulation start time txs1 and the reading termination time txe1 of the first X-ray frame and outputs.

Further, the arithmetic operation unit 118 of the X-ray frame accumulation charge quantity calculates the dark current accumulation charge quantity Qwx1 of the first X-ray frame by the equation (1) by using the idling time period Txi1 and the accumulation period Tx1 of the X-ray frame and the dark current response characteristics stored in the dark current response characteristic memory 119.

Subsequently, the image processing unit 110B multiplies the offset image by (Qwx1/Qw) by using the dark current accumulation charge quantity Qw of the offset frame and the dark current accumulation charge quantity Qwx1 of the first X-ray frame, thereby conducting the correction regarding the dark current component. The image processing unit 110B conducts the offset correction of the X-ray image of the first frame by using the dark current corrected offset correction data and subsequently executes the necessary various types of image processing such as gain correction and the like (S311), thereby allowing the corrected image to be displayed onto the display 121 (S312).

In step S310, the radiographing control unit 115B supplies accumulation start time txs2 of the second X-ray frame as a second frame to the X-ray frame idling period measuring unit 117 and the X-ray frame accumulation period measuring unit 120. The X-ray frame idling period measuring unit 117 stores the supplied accumulation start time txs2 of the second X-ray frame. The X-ray frame idling period measuring unit 117 calculates an idling time period Txi2 (=txs2−tis) of the second X-ray frame and outputs. The X-ray frame accumulation period measuring unit 120 stores the supplied accumulation start time txs2 of the second X-ray frame.

In the embodiment, after the reading of the X-ray frame was terminated, the radiographing of the next X-ray frame is continuously executed. Therefore, reading termination time txen of the X-ray frame as an nth frame becomes accumulation start time txs(n+1) of the X-ray frame as a next (n+1)th frame.

After the corrected image was displayed onto the display 121, the control unit 114B increases a value of the number n of radiographed frames by "1" (S313) and discriminates whether or not the radiographing has been terminated (S314).

The operation in steps S308 to S314 is repeated until the termination of the radiographing has been determined. While the time is updated, the radiographing of the X-ray frames is performed in order of the second frame, the third frame, .... The arithmetic operation unit 118 of the X-ray frame accumulation charge quantity calculates a dark current accumulation charge quantity Qwxn of the X-ray frame of the nth frame every frame. The image processing unit 110B multiplies the offset image by (Qwxn/Qw), thereby conducting the correction regarding the dark current component of the offset frame which has been radiographed first and conducting the offset correction of the X-ray image by using the corrected offset correction data. In this manner, the image processing unit 110B continuously executes the radiographing of the X-ray frames and executes the radiographing of the motion images.

Other Embodiments of the Invention

The invention also incorporates an example in which in order to make various types of devices operative so as to realize the functions of the embodiments mentioned above, a program of software to realize the foregoing functions of the embodiments is supplied to a computer (CPU or MPU) in the apparatus or system connected to the various devices and the various devices are made operative according to the program stored in the computer of the system or apparatus, thereby embodying those functions. In such a case, the program itself of the software realizes the foregoing functions of the embodiments and the program itself constructs the invention. A unit for supplying the program to the computer, for example, a storage medium in which such a program has been stored constructs the invention. As a storage medium for storing the program, for example, a flexible disk, a hard disk, an optical disk, a magnetooptic disk, a CD-ROM, a magnetic tape, a non-volatile memory card, a ROM, or the like can be used. Naturally, even in the case where the supplied program realizes the foregoing functions of the embodiments in cooperation with an operating system, another application software, or the like which is operating in the computer, such a program is incorporated in the embodiment of the invention. Further, naturally, the invention also incorporates a case where the supplied program is stored in a memory equipped for a function expanding board or a function expanding unit regarding the computer and, thereafter, a CPU or the like equipped for the function expanding board, function expanding unit, or the like executes a part or all of actual processes based on instructions of the program. Naturally, a case where the foregoing functions of the embodiments are realized by those processes is also incorporated in the invention. For example, the invention also incorporates a case where the control unit 114A (114B) and the image processing unit 110A (110B) are realized by functions of a computer having a CPU, a ROM, and a RAM, a processing program for executing the processing operations as mentioned above is preliminarily stored in the ROM, and the CPU reads out the processing program from the ROM and executes it, thereby making control for realizing the foregoing processing operation.

The foregoing embodiments are nothing but specific examples for embodying the invention. A technical scope of the invention must not be limitatively interpreted by those examples. That is, the invention can be embodied in various forms without departing from a technical idea of the invention or its principal feature.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-100813, filed Apr. 6, 2007, which is hereby incorporated by reference herein in its entirety.

What is claimed is:

1. An imaging apparatus comprising:
    a detection unit including a plurality of conversion elements arranged in an array on a substrate for converting incident radiation or incident light into an electric signal, to derive an image based on the electric signal;
    a memory unit for storing dark current response characteristics of the detection unit based on a time after applying a bias to the conversion elements;
    an accumulation charge quantity arithmetic operation unit for calculating a dark current accumulation charge quantity included in the accumulation, based on the dark current response characteristics, a first time period from an applying of a bias to the conversion elements until a start of an accumulation of the conversion elements for deriving the image and a second time period from a start of the accumulation until an end of the accumulation; and
    an image processing unit for conducting an offset correction of the image derived based on the dark current accumulation charge quantity.

2. The imaging apparatus according to claim 1, further comprising:
    an accumulation time period arithmetic operation unit for calculating a third time period for deriving the dark current accumulation charge quantity from the detection unit, based on the dark current response characteristics, the first and second time periods and the dark current accumulation charge quantity; and
    a control unit for controlling the detection unit according to the third time period,
    wherein the image processing unit conducts the offset correction of the image based on offset correction data derived from the detection unit controlled by the control unit according to the third time period.

3. The imaging apparatus according to claim 1, wherein the image processing unit conducts the offset correction of the image based on offset correction data derived by an arithmetic operation processing of offset data preliminarily derived according to the dark current accumulation charge quantity of the radiographing calculated from the dark current response characteristics and the first and second time periods.

4. The imaging apparatus according to claim 1, wherein the image processing unit conducts the offset correction of the image, based on offset correction data generated based on the first time period, the second time period and the dark current response characteristics.

5. The imaging apparatus according to claim 1, wherein the conversion elements are formed from amorphous silicon as a main component material.

6. The imaging apparatus according to claim 1, wherein each of the conversion elements comprises a wavelength converter for converting the incident radiation into light, and a photoelectric conversion element for converting the converted light into the electric signal.

7. The imaging apparatus according to claim 1, wherein the imaging apparatus is incorporated in an imaging system that includes a radiation generating apparatus for generating the radiation.

8. A controlling method of an imaging apparatus that includes a detection unit, which includes a plurality of conversion elements arranged in an array on a substrate for converting incident radiation or incident light into an electric signal, to derive an image based on the electric signal, and a memory unit for storing dark current response characteristics of the detection unit based on a time after applying a bias to the conversion elements, the method comprising steps of:

calculating a dark current accumulation charge quantity included in the accumulation, based on a first time period from an applying of a bias to the conversion elements until a start of an accumulation of the conversion elements for deriving the image, a second time period from a start of the accumulation until an end of the accumulation and the dark current response characteristics; and conducting an offset correction of the image derived based on the dark current accumulation charge quantity calculated.

9. A storage medium storing a program for a controlling method of an imaging apparatus that includes a detection unit, which includes a plurality of conversion elements arranged in an array on a substrate for converting incident radiation or incident light into an electric signal, to derive an image based on the electric signal, and a memory unit for storing dark current response characteristics of the detection unit based on a time after applying a bias to the conversion elements, wherein the program is executed by a computer to perform steps of:

calculating a dark current accumulation charge quantity included in the accumulation based on a first time period from an applying of a bias to the conversion elements until a start of an accumulation of the conversion elements for deriving the image, a second time period from a start of the accumulation until an end of the accumulation and the dark current response characteristics; and conducting an offset correction of the image derived based on the dark current accumulation charge quantity calculated.

* * * * *